Oct. 11, 1932.    R. E. NIDY    1,881,878
SAFETY DEVICE FOR AIRPLANE PILOTS
Filed Feb. 5, 1929    2 Sheets-Sheet 1
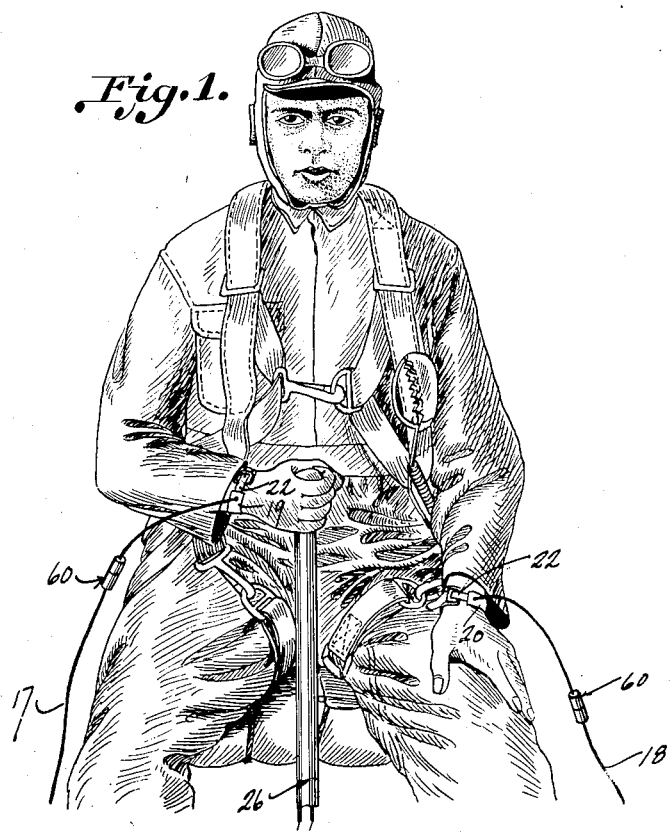
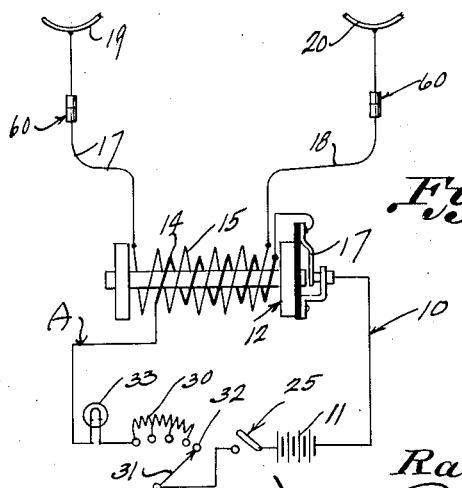
INVENTOR.
Ralph E. Nidy
BY Lancaster and Allwine
ATTORNEYS.

Oct. 11, 1932.  R. E. NIDY  1,881,878
SAFETY DEVICE FOR AIRPLANE PILOTS
Filed Feb. 5, 1929    2 Sheets-Sheet 2
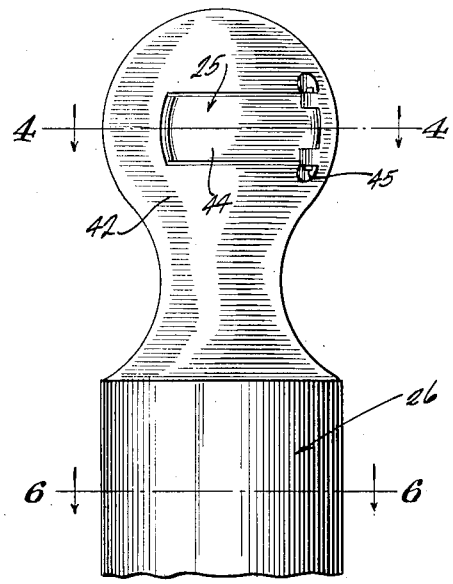
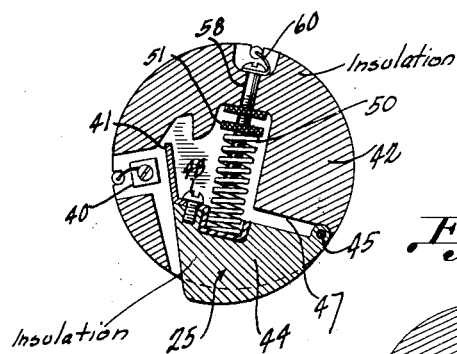
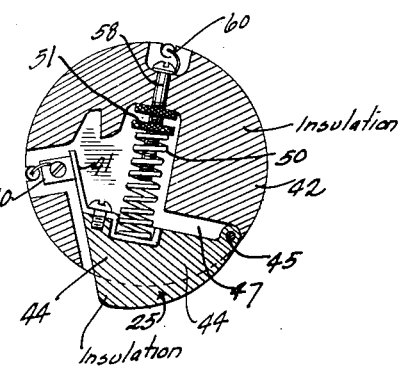
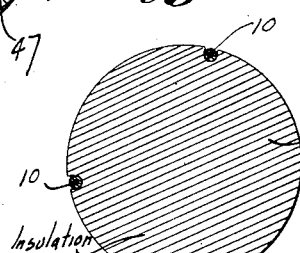
INVENTOR.
Ralph E. Nidy
BY
ATTORNEYS.

Patented Oct. 11, 1932

1,881,878

UNITED STATES PATENT OFFICE

RALPH E. NIDY, OF GREENTOWN, OHIO

SAFETY DEVICE FOR AIRPLANE PILOTS

Application filed February 5, 1929. Serial No. 337,656.

This invention relates to improvements in safety devices for use by aircraft pilots, in order to prevent the pilot from going to sleep.

It is well known that due to the constant vibration and hum of the engine and propeller of aircraft, the occupants thereof, and particularly the pilot, becomes drowsy, and cases have been known where the pilot has fallen asleep. This fact is not due so much to fatigue as to the uniform vibration and sounds which cause drowsiness. It is an object of this invention to provide means directly under the control of the pilot, for the purpose of sending an electrical shock through the body of the pilot should there be any tendency to relax.

A further object of the invention is the provision of means providing an electric circuit, of which an airplane pilot's body forms a part, normally maintained open by means of a switch which is placed upon a control device for the aircraft, in such manner that it is under the control of the operator during piloting of the plane; the switch being operative to close the circuit should there be any tendency on the part of the pilot to relax the proper guiding of the plane through the medium of the control device.

Other objects and advantages of this invention will be apparent during the course of the following detailed description.

In the accompanying drawings, forming a part of this specification, and wherein similar reference characters designate corresponding parts throughout the several views, Figure 1 is a view showing an aircraft pilot grasping the control stick or member, which is manually operated for the purpose of piloting the aircraft; the wires of a circuit forming part of the invention, being connected to parts of the body of the pilot for the purpose of causing an electrical shock should there be any lack of vigilance upon the part of the pilot guiding the aircraft.

Figure 2 is a diagrammatic representation of the wiring details and circuit of the invention.

Figure 3 is a side view of the upper end of a stick or control member which is used in manually controlling the aircraft.

Figure 4 is a sectional view taken substantially on the line 4—4 of Figure 3, showing the circuit controlling switch of the stick open, as the parts will be positioned when the stick is grasped or manually operated in the usual relation by the pilot.

Figure 5 shows the relation of parts of the switch mechanism on the joy stick, which they will assume if there is any release of manual control of the joy stick or operating member due to relaxation of the pilot.

Figure 6 is a transverse sectional view taken substantially on the line 6—6 of Figure 3.

In the drawings, wherein for the purpose of illustration is shown only a preferred embodiment of the invention, the letter A may generally designate the invention, which comprises a circuit 10, wherein a battery 11, or other source of electric current is provided. In the circuit 10 is disposed a conventional device 12, such as an induction coil or inductorium. The device 12 includes primary and secondary windings 14 and 15; the former of which is connected at one end directly in the circuit 10 by means of an interrupter or vibrator 17. The primary is of course connected at opposite ends in the circuit 10. The secondary winding 15 at opposite ends is provided with wires 17 and 18, having contacts 19 and 20 respectively which may be clamped as by releasable wrist straps or bands 22, see Figure 1, about the body of the operator, in a manner such as shown in Figure 1. The secondary winding 15 together with the windings 17 and 18 and their respective contacts and the body of the pilot form a circuit through which an induced current flows when the circuit 10 is closed and the coil in operation.

The circuit 10 is provided with a switch 25, placed upon an aircraft controlling member 26, in position to be manually operated and normally held open by such manual operation that the circuit 10 is normally inactive. In the circuit 10 is also disposed a rheostat 30 of usual construction, for varying the intensity of the current from the source 11; an arm 31 operating over the contacts of the rheostat being so related as to move to a location 32 to hold the circuit 10 open if it is not desired to use the device A during short airplane flights, or under other circumstances. In the circuit 10 is also disposed a small signal lamp 33, preferably red, which is illuminated as long as any current flows through the circuit 10. This may indicate the efficiency of the circuit, and may be used to indicate to other occupants of an aircraft whether the pilot is constantly controlling the aircraft.

The control switch 25 is of novel construction. The ends of wires in the circuit 10 are connected in the control member 26 by contacts 40 and 41. The control member 26 is provided with a ball-shaped handle 42, in which the switch 25 is provided. The switch 25 includes a movable arm 44, forming a segment of the hand grasp 42, and being pivoted at 45 to the hand grasp portion 42 for movement into and out of a recess 47 provided in the body of the hand grasp 42. The contact 40 is stationary in the recess 47, and the other contact 41 is clamped at 48 on the inner side of the movable switch arm 44, in such position that it may be moved into or out of engaging relation with the contact 40. A spring 50, under compression, is disposed in the recess 47, seated at one end on the contact 41, and at its other end seating against an adjusting nut 51, and in position to be compressed to various extents for normally urging the switch arm 44 into a peripherally extended relation beyond the body of the hand grasp 42, for relative engagement of the contacts 40 and 41 to close the circuit 10. The nut 51 is adjustable upon a screw 58 which is carried by the body of the hand grasp portion 42, and which also clamps an end of a wire 60, forming part of the circuit 10, in a conducting relation with the contact 41 above mentioned. It is apparent that upon rotation of the screw 58, the nut 51 may be fed therealong for varying the tension of the compression spring 50. As is shown in Figure 5 of the drawings, the action of the spring is to force the contacts 40 and 41 into engagement for closing the circuit. During normal control of the aircraft the pilot grasps the portion 42 of the stick 26, and presses the portion of the switch arm 44 which extends peripherally beyond the hand grasp portion 42, inwardly into the recess 47 for releasing the relative engagement of the contacts 40 and 41, and breaking the circuit 10. Of course, so long as the operator consciously guides the aircraft by manual operation of the stick 26, the circuit thru the electrodes 19 and 20 attached to his body or person will not function. With the arm 31 engaging one of the rheostat contacts, and the other parts of the apparatus functioning in closed order, should the pilot for any reason release manual control of the controlling device 26 for the aircraft, the spring 50 will cause the contacts 40 and 41 to engage and close the switch 25. This sends the current in the circuit 10 thru the primary winding 14, setting up an induced current in the secondary winding 15, and causing the intermittent current which is thus induced by the inductorium 12 to pass through the body of the pilot. The effect of passing an electric current through the pilot's body will of course be to awaken him.

In order that the connecting wires to the person of the pilot will not prove an impediment to his jumping free of the aircraft in event an emergency parachute jump is required, it is preferred to provide plugs 60 in each of the wires 17 and 18; each of the plugs 60 comprising a pair of easily releasable parts. It is apparent that when the pilot jumps free of the aircraft, the plugs 60 will release without endangering the pilot's life. The plugs 60 furthermore enable the pilot to quickly release himself from the wiring 27 and 28 for any purpose desired.

Various changes in the shape, size, and arrangement of parts may be made to the form of invention herein shown and described, without departing from the spirit of the invention or the scope of the claims.

I claim:

1. In a device for insuring the safety piloting of aircraft the combination with an aircraft control device adapted to be manually engaged by a pilot for operation, a switch on said control device at the part which is manually engaged and in position to be held open by such manual engagement, circuit means including the switch for sending a charge of electricity thru the body of the pilot, and means on the control device to normally close the switch upon release by the pilot.

2. In a device for insuring the safety operation of aircraft the combination of an electric circuit of a nature to impart an appreciable shock to a person sufficient to arouse the person, means for connecting the body of a person in said circuit, a switch on an aircraft control member for closing said circuit, and to be opened by a manual engagement of an aircraft pilot therewith for opening said circuit during conscious operation of the control member by the pilot, and means normally urging said switch to a closed position.

3. In a device for imparting electrical shocks to aircraft pilots to prevent their going to sleep while on duty, the combination of an electric circuit having means therein for imparting pulsating shocks to the person of the pilot, said circuit having means therein for connecting the body of a pilot as part of the circuit, a switch for the circuit on the manually engageable portion of an aircraft control member in position to be thrown open by normal pilot operation of the control member, and means normally urging said switch to a closed position.

4. In a device for insuring the safe operation of power driven manually controlled vehicles the combination of an electric circuit of a nature to impart an appreciable shock to a person sufficient to awaken such person from sleep and drowsiness, means for connecting the body of a person in said circuit, a switch on a manual control member of a vehicle for closing said circuit in position to be grasped by an individual and opened as an incident of manual operation of said control member in order to open said circuit during conscious operation of the control member by the individual, and means normally urging said switch to a circuit closing position.

5. In a device for insuring the proper operation of an instrumentality which includes a manually engageable control member for its operation, the combination of an electric circuit of a nature to impart an appreciable shock to an operator sufficient to arouse the operator from sleep, means for connecting the body of an operator in said circuit, a switch placed on the control member in position to be grasped by the operator during manual operation of the control member of said instrumentality of a nature to be opened by such manual operation of the control member, and means normally urging said switch to a circuit closing position.

RALPH E. NIDY.